3,426,046
SYNTHESIS OF EPOXIDES FROM ALLYLIC SULFONIUM SALTS

Melvin J. Hatch, Midland, Mich., assignor to The Dow Chemical Company, Midland, Mich., a corporation of Delaware
No Drawing. Filed Oct. 22, 1965, Ser. No. 502,365
U.S. Cl. 260—348
Int. Cl. C07d 1/06
4 Claims

---

ABSTRACT OF THE DISCLOSURE

Reaction of an allylic sulfonium salt with an aldehyde free of α-hydrogen in the presence of a strong aqueous base provides a novel synthesis of organic epoxides including propylene oxide and 3,4-epoxybutene.

---

This invention concerns a process for preparing organic epoxides by reacting an allylic sulfonium salt with an aldehyde free of α-hydrogen in the presence of a strong aqueous base. More particularly it concerns formation of a vinylidene epoxide by the reaction:

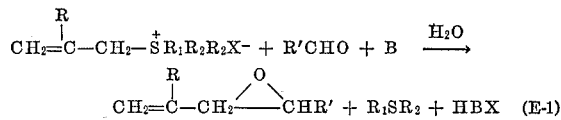

wherein R is H or a $C_1$–$C_4$ alkyl group,
$R_1$ and $R_2$ are independently $C_1$–$C_4$ alkyl or hydroxyalkyl groups,
X is a counteranion,
R'CHO is an aldehyde free of α-hydrogen, and
B is a strong water soluble base.

The formation of alkyl sulfonium ylides from sulfonium salts in a strongly basic, non-aqueous solution is known. For example, dimethylsulfonium methylide

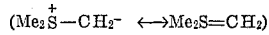

is formed by reaction of trimethylsulfonium iodide with methylsulfinylcarbanion in dimethylsulfoxide. Such sulfonium ylides can react in the non-aqueous solution with carbonyl compounds to form epoxides. [Corey & Chaykovisky, J. Am. Chem. Soc., 84, 3782 (1962); Franzen & Driessen, Tetrahedron Letters, 661 (1962), Ber., 96, 1881 (1964).] Although a similar reaction in aqueous solution with a common inorganic base would have numerous advantages for industrial practice, it has not been described.

It has now been discovered that allylic sulfonium salts react in strongly alkaline aqueous solutions with an aldehyde free of α-hydrogen to form vinylidene epoxides. By this process many aldehydes can be converted into useful epoxides. Indeed, such vinylidene epoxides are difficult to prepare by other methods.

However, the reaction conditions are important. Formation of the vinylidene epoxide is favored by a high aldehyde concentration and a moderate reaction temperature. Also addition of a water-insoluble extractant to remove the epoxide from the aqueous phase as it is formed is often desirable for best yields. Therefore, a preferred embodiment comprises reacting an allylic sulfonium salt with an aldehyde free of α-hydrogen and a strong water-soluble base in a heterogeneous mixture of water and a water-insoluble organic extractant to form a vinylidene epoxide.

In addition a facile competing reaction has been discovered wherein the allylic sulfonium salt is itself converted by the strong aqueous base into an alkylene oxide by the reaction:

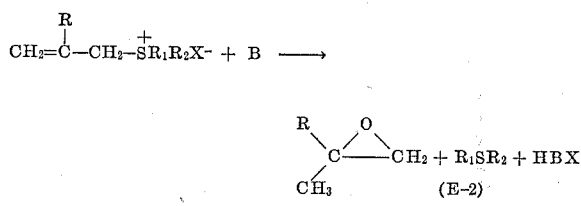

wherein R, $R_1$, $R_2$, X and B are defined as above.

This reaction occurs readily at 50°–80° C. For example, reaction of allyldimethylsulfonium chloride with aqueous NaOH at 60°–80° C. gives a 50–60% yield of propylene oxide in less than 0.5 hour.

Reactants

Essential is an allylic sulfonium salt of the formula:

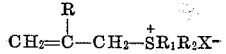

wherein R is H or a $C_1$–$C_4$ alkyl group,
$R_1$ and $R_2$ are independently $C_1$–$C_4$ alkyl or hydroxyalkyl groups, and
X is a counteranion.

Such sulfonium salts can be prepared by known reactions. For example, allyl and methallyl sulfonium salts are obtained by reaction of allyl or methallyl chloride with dimethyl sulfide or bis(2-hydroxyethyl)sulfide.

Normally the allylic sulfonium salts have a halide counteranion (X). However, the halide salt can be converted into other anionic salts such as the carbonate, nitrate, sulfate, acetate, perchlorate or tosylate salt by conventional ion exchange techniques when desired.

The process is effectively limited to the condensation of allylic sulfonium salts with aldehydes free of α-hydrogen because of competing reactions. Formaldehyde, furfural, benzaldehyde, p-terephthaldehyde, and other $C_6$–$C_{12}$ aromatic aldehydes are particularly suitable. The aldehyde can contain more than one reactive carbonyl group as well as alkyl, halo, hydroxyl, alkoxyl and similar substituent groups which do not interfere with the desired epoxidation.

The process also requires a strong water-soluble base (B). The base should have a water solubility of at least 0.1 weight percent and a $pK_a$ in aqueous solution of at least 11.0. Sodium hydroxide is preferred, but other strong alkaline and alkaline earth metal bases such as potassium hydroxide, lithium hydroxide, calcium hydroxide or calcium oxide can be used.

Reaction conditions

Water is an effective solvent for the allylic sulfonium salts. Indeed the sulfonium salts are often prepared in aqueous solution and such solutions can be used in the present process without isolation of the sulfonium salt. At times addition of a moderate amount of a water-soluble $C_1$–$C_6$ alcohol, such as methanol, isopropanol, ethylene glycol, 2-ethoxyethanol, or 1,4-butanediol, is advantageous to increase the mutual solubility of the reactants.

In a preferred process, a water-insoluble organic extractant is added to remove the epoxide from the aqueous phase as it is formed, thereby minimizing hydrolysis and other reactions. To facilitate recovery of the extracted expoxide, an extractant with a boiling point between 30° C. and 130° C. is often used. Particularly suitable are aliphatic and aromatic hydrocarbons such as hexane, heptane, cyclohexane, benzene, toluene, and ethylbenzene as well as kerosene and petroleum naphtha. $C_1$–$C_4$ chlorinated hydrocarbons which are stable to aqueous alkali under reaction conditions also are effective extractants. Typical are methylene chloride, carbon tetrachloride, methylchloroform, 1,2-dichloroethane and 1,2-dichloropropane.

At times with a less reactive epoxide and carefully controlled, good yields can be obtained without an extractant. Low boiling epoxides can occasionally be distilled directly out of the aqueous phase. But in general use of a water-insoluble extractant is preferred.

As indicated in Equation 1, at least one mole of base is required per mole of sulfonium salt. Generally a moderate excess of base, e.g., about 1.2–5.0 moles of base per mole of sulfonium salt is desirable. Also, for good yields of the vinylidene epoxide, a slight excess of aldehyde is preferred.

Optimum conditions for a given epoxidation will depend upon the reactivity and stability of the reactants and products. For example, decreasing the rate of competing base-catalyzed reactions of the aldehyde generally favors epoxidation. Also the yield of vinylidene epoxide is greatly influenced by the reaction temperature and aldehyde concentration. The allylic sulfonium salts react readily in aqueous alkali at temperatures of about 20°–100° C. Substantially complete reaction is often achieved in 0.1–2 hours at 30°–80° C. However, a lower reaction temperature, e.g., 5°–60° C., and a high concentration of sulfonium salt and aldehyde favor the formation of the vinylidene epoxide. At higher temperatures and in dilute solution the hydrolytic rearrangement of the allylic sulfonium salt to an alkylene oxide occurs at a significant rate.

Within the general scope of the disclosed process, optimum reaction conditions for a given epoxidation can be determined in a routine manner. When necessary a moderate pressure can be used to maintain a liquid phase and minimize the loss of volatile materials.

To illustrate further the present invention the following examples are given. Unless otherwise specified, all parts atnd percentages are by weight.

Example 1.—3,4-epoxy-4-phenyl-1-butene

A. A mixture of 282 parts (3.79 mole) of allyl chloride, 255 parts (4.11 mole) of dimethyl sulfide and 300 parts of water were stirred at room temperature for 8 days. The aqueous phase was separated and purged with nitrogen to remove residual dimethyl sulfide. By analysis it was 4.75 N in sulfonium chloride with an 89% conversion to allyldimethylsulfonium chloride and less than 1% hydrolysis.

B. To a stirred mixture of 0.30 mole of the aqueous allyldimethylsulfonium chloride solution, 0.30 mole of benzaldehyde and about an equal volume of toluene at 30° C. was rapidly added 0.45 mole of 30% sodium hydroxide. An exothermic reaction occurred with a temperature rise to about 60° C. After about 15 minutes at 60–65° C., the organic phase was separated.

An epoxide analysis of the recovered organic phase by the pyridine·HCl method indicated a 58% yield of expoxides based on the initial sulfonium salt. Infrared and chromatographic analysis established the presence of both propylene oxide (21%) and 3,4-epoxy-4-phenyl-1-butene (37%). Fractional distillation gave a 35% yield of a liquid, 3,4 - epoxy - 4 - phenyl - 1 - butene with a minimum purity of 85% by epoxy and olefinic functional group analyses.

Nuclear magnetic resonance spectra of the distilled product indicated that it contained about 40% cis- and 60% trans-epoxide. Mass spectra data were consistent with this isomer distribution. Analysis of the distillation fractions boiling below 65° C. confirmed the presence of about 20% propylene oxide.

C. Table 1 summarizes data from similar runs made with 1.2–4.5 N aqueous allyldimethylsulfonium chloride. In some instances the initial sulfonium chloride was prepared in methanol or isopropanol rather than water and the aqueous alcohol was used as the epoxidation medium. The yields of epoxybutene and propylene oxide given in Table 1 are based on gas chromatographic analysis of the recovered organic phase.

TABLE I.—SYNTHESIS OF 3,4-EPOXY-4-PHENYL-1-BUTENE

| | Mole Ratio | | Extractant | Temp., ° C. | | Time | Percent Yield [1] | |
|---|---|---|---|---|---|---|---|---|
| | φCHO/S+ | NaOH/S+ | | Initial, ° | Max., ° | | Epoxybutene, Percent | Propylene Oxide, Percent |
| Run: | | | | | | | | |
| 1-1 | 1.0 | 1.6 | Benzene | 35 | 60 | 15 minutes | 37 | 21 |
| 1-2 | 1.0 | 1.6 | Toluene | 35 | 60 | do | 48 | 18 |
| 1-3 | 3.0 | 1.4 | Benzene | 40 | 70 | 60 minutes | 57 | 13 |
| 1-4 | 1.0 | 2.5 | Toluene | 35 | 65 | 10 minutes | 48 | 18 |
| 1-5 | 1.0 | 1.6 | do | 5 | 15 | {1 hour / 16 hours} | 35 / 60 | 0 / 1 |
| 1-6 | 1.0 | 1.4 | Perchloroethylene | 25 | 35 | 2 hours | 28 | 10 |
| 1-7 | 1.0 | 1.3 | None [2] | 25 | 50 | do | 63 | 1-2 |
| 1-8 | 1.0 | 1.6 | Do. [2] | 35 | 70 | 2.5 hours | 73 | 1 |

[1] By gas chromatographic analysis based on initial sulfonium salt.   [2] Run in aqueous alcohol.

Example 2.—3,4-epoxy-1-butene

To a stirred mixture of 1.0 mole of 4.5 N aqueous allyldimethylsulfonium chloride, 3.0 mole of 30% formaldehyde and about an equal volume of toluene at 45°C. was added 1.35 mole of 50% NaOH in 3 portions. A vigorous reaction occurred with a temperature rise to 70° C. After 10 minutes reflux at 70° C., the mixture was cooled and the organic phase recovered. By analysis a 25% yield of mixed epoxides was found based on initial sulfonium salt. Distillation, chromatographic and infrared analyses indicated an 8% yield of 3,4-epoxy-1-butene and a 12% yield of propylene oxide.

Example 3.—4-furfuryl-3,4-epoxy-1-butene

A mixture of 0.30 mole of allyldimethylsulfonium chloride and 0.30 mole of 2-furfural in water and benzene was stirred and heated to about 35° C. Then 0.47 mole of 50% NaOH was added. After 15 minutes at reflux, the mixture was quenched and the light brown organic phase was separated. After stripping dimethyl sulfide and benzene, the liquid residue was distilled in vacuo. A 69% yield of liquid 4-furfuryl-3,4-epoxy-1-butene, B.P.

51–53° C./3 mm. was obtained. The epoxide had a minimum purity of 92% by epoxide analyses.

Example 4.—4-phenyl-3,4-epoxy-2-methyl-1-butene

A mixture of 0.15 mole of 4.3 N aqueous methallyldimethylsulfonium chloride, 0.15 mole of benzaldehyde, 0.24 mole of 50% NaOH and about an equal volume of benzene was heated at reflux (63–65°C.) for 1.5 hours. The organic phase was separated, neutralized, and then the volatile material was stripped by distillation. The overhead distillate contained a 1–2% yield of isobutylene oxide while the residue contained a 57% yield of 4-phenyl-3,4-epoxy-2-methyl-1-butene.

Example 5.—Alklyene oxides

The discovery that propylene oxide is obtained as a by-product in the reaction of allyldimethylsulfonium chloride in a strongly alkaline aqueous solution as shown in Example 1, prompted study of this unexpected reaction. The reaction which is characteristic of allylsulfonium salts of the formula:

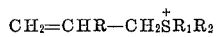

$$CH_2=CHR-CH_2\overset{+}{S}R_1R_2$$

wherein R is H, or a $C_1$–$C_4$ alkyl group, and $R_1$ and $R_2$ are independently $C_1$–$C_4$ alkyl or hydroxyalkyl groups, involves a hydrolytic rearrangement of the allylic sulfonium salt. This rearrangement occurs rapidly at temperatures greater than 50°C. and at 70–80°C. competes effectively with the reaction of the sulfonium salt with benzaldehyde. It is sensitive to the sulfonium structure. Best results are obtained with a dimethylsulfonium salt although the rearrangement is also observed with diethyl, di-n-butyl and bis(2-hydroxyethyl) sulfonium salts. Also a terminal vinylidene group is required, the reaction not being observed to any appreciable extent with crotonyl or cinnamyl sulfonium salts. It is favored by a high concentration of sulfonium salt and base. Under certain conditions the alkylene oxide can be distilled directly from the aqueous base as it is formed. At other times, use of a water-insoluble extractant for the oxide is desirable.

A. A mixture of 0.32 mole of 4.5 N aqueous allyldimethylsulfonium chloride, 0.35 mole of 10 N NaOH and an equal volume of benzene prepared at room temperature was heated with stirring at reflux at about 65°C. for 1 hour. After cooling the organic phase was recovered and found to contain a 58% yield of propylene oxide. Analysis of the aqueous phase indicated essentially complete reaction of the sulfonium salt.

In a similar reaction with allylbis(2-hydroxyethyl) sulfonium chloride and allyldiethylsulfonium chloride 14% and 27% yields respectively of propylene oxide were obtained.

B. A mixture of 0.17 mole of 4.5 N aqueous allyldimethylsulfonium chloride, 0.18 mole of 10 N NaOH and 4.5 volumes of methylene chloride was refluxed (40°C.) for 1 hour. Analysis of the aqueous phase indicated a 57% reaction of the sulfonium salt. The recovered methylene chloride was found to contain a 20% yield of propylene oxide based on reacted sulfonium salt.

C. Table 2 presents data from a number of runs under varying conditions including addition of aqueous NaOH to a preheated mixture of the sulfonium salt and benzene, and addition of aqueous sulfonium salt to preheated aqueous NaOH with the propylene oxide being collected in the overhead distillate.

TABLE 2.—PROPYLENE OXIDE FROM ALLYLDIMETHYLSULFONIUM CHLORIDE

| Run: | Method | Conditions | Yield of PO |
|---|---|---|---|
| 2-1 | Reactants added initially | 65°, 1 hr | 58% |
| 2-2 | do | 65°, 2.5 hr | 47% |
| 2-3 | NaOH added to $\overset{+}{S}$/ΦH | 65°, 0.5 hr | 52% |
| 2-4 | $\overset{+}{S}$ added to NaOH/ΦH | 70°, 0.2 hr | 47% |
| 2-5 | $\overset{+}{S}$ added to NaOH [1] | 100°, 0.2 hr | [1] 19% |
| 2-6 | do.[1] | 60°, 0.5 hr | [1] 29.5% |

[1] No extractant; propylene oxide collected overhead.

D. A mixture of 0.99 mole of 4.2 N methallyldimethylsulfonium chloride prepared from methallyl chloride and dimethyl sulfide, 1.0 mole of 10 N NaOH and 0.6 volume of benzene was heated at reflux (68°C.) for 0.5 hours. Analysis of the aqueous phase indicated a 50% reaction of the methallylsulfonium salt. Distillation of the organic phase and analysis of the product cuts indicated a recovery of 0.38 mole of dimethylsulfide and 0.31 mole of isobutyene oxide. Based on reacted sulfonium salt, the yield of isobutylene oxide was 62%.

I claim:
1. A process for preparing an alkylene oxide of the formula:

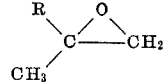

wherein R is H or a $C_1$–$C_4$ alkyl group which comprises reacting an allylic sulfonium salt of the formula:

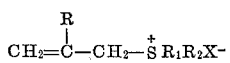

wherein R is H or a $C_1$–$C_4$ alkyl group
$R_1$ and $R_2$ are independently $C_1$–$C_4$ alkyl or hydroxyalkyl groups, and
X is a counteranion, with an aqueous solution of a water-soluble base having a $pK_a$ greater than 11.0 to form an alkylene oxide.

2. The process of claim 1 wherein the base is sodium hydroxide.

3. The process of claim 1 wherein a water-insoluble organic extractant is added to the reaction mixture to remove the alkylene oxide from the aqueous phase as it is formed.

4. The process of claim 3 wherein the alkylene oxide is isobutylene oxide.

References Cited

Corey et al., J. Am. Chem. Soc. 84, 3782 (1962).
Franzen et al., Tetrahedron Letters, 661 (1962).
Franzen et al., Ber., 96, 1881 (1964).

NORMA S. MILESTONE, *Primary Examiner.*

U.S. Cl. X.R.

260—347.2, 607, 609